Oct. 16, 1951  S. A. HAYES  2,571,870
EDUCTOR NOZZLE
Filed Aug. 9, 1946
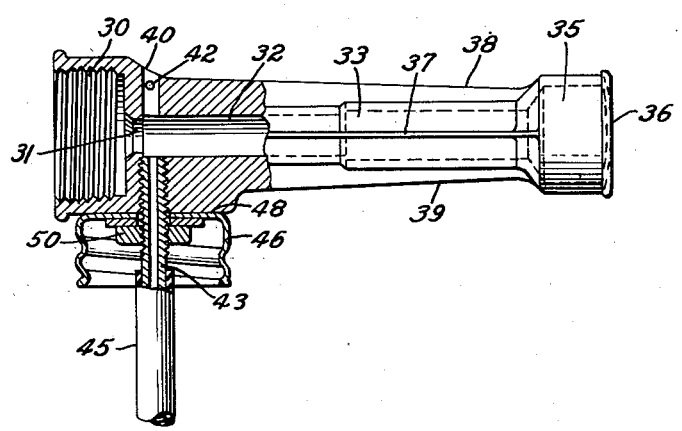
INVENTOR.
STANLEY A. HAYES
BY Christie and Angus
ATTORNEYS Patented Oct. 16, 1951

2,571,870

UNITED STATES PATENT OFFICE 2,571,870

EDUCTOR NOZZLE

Stanley A. Hayes, Pasadena, Calif.

Application August 9, 1946, Serial No. 689,556

3 Claims. (Cl. 299—84)

This invention is concerned with overhead irrigation and provides improved garden hose nozzles and the like adapted to reduce erosion and to increase soil aeration with consequent beneficial effect upon plants thus irrigated. In one aspect, the invention affords an aerating hose nozzle which can be used at will to suck in and dispense (along with aerated water stream) fertilizers, insecticides, weed killers and similar agricultural chemicals in solution or in suspension.

Soil erosion due to overhead irrigation may be reduced markedly by supersaturating the stream of irrigating water with air or other gas and bringing the water into contact with the soil while it still contains large proportions of gas dispersed as a separate phase.

I have developed a simple nozzle for producing a super-aerated spray. The nozzle supersaturates an irrigating water stream with air. Moreover, the spray itself is made finer by the act of supersaturation.

The nozzle of my invention comprises a conduit having a connection for high pressure water, followed serially by an eductor with an inlet for atmospheric air and a spray head, preferably a perforated plate. The eductor must be so constructed that it will operate efficiently even against the substantial back pressure or resistance that is offered by the spray head. A simple Venturi type of eductor is not suitable because it will not so aspirate. The most suitable type is one provided with a small throat (having one or more inlet ports for the air) followed by an enlarged concentric chamber, this in turn being followed by a still larger concentric chamber.

In other words, the outlet side of the eductor is enlarged stepwise in two or more steps. Preferably the steps should be in a substantially straight line for reasons discussed below.

One form of the hose nozzle of my invention is provided with a suction leg adapted to project into a container for liquid fertilizer or the like which is fastened on the side of the nozzle. When the liquid is to be sucked out of the container and dispersed with the water, a finger is put over the air inlet on the nozzle, thus providing the necessary suction in the container.

If desired, a small bypass for air may be provided on the atmospheric air inlet so that even when it is stopped with the finger a restricted amount of aeration still takes place.

The invention will become clear from the following detailed description thereof taken in conjunction with the accompanying drawing which is a longitudinal view, partly in section, of a presently preferred embodiment of the invention.

The nozzle shown in the drawing is provided with an inlet 30 having interior threads to be screwed onto a hose nipple. This is followed by the small throat 31 disposed coaxially in the nozzle. Thereafter there is a first enlarged eductor chamber 32 which is enlarged abruptly into a second eductor chamber 33. This in turn flares into an expansion chamber 35 in the end of the nozzle, which is closed by a perforated plate 36.

For reasons of strength and economy of material, the nozzle is provided with longitudinal reinforcing ribs 37, 38, 39 arranged at 90° from each other around the periphery of the nozzle.

The nozzle has one main air inlet port 40, projecting through the wall of the nozzle at right angles to its longitudinal axis and at the beginning of the first eductor chamber 32. The outside end of inlet port 40 is disposed conveniently so that it can be closed by the thumb during operation. A small branch conduit or bypass 42 is drilled transversely through the side of the main air inlet port, so that when the thumb is placed over the port a restricted amount of air can still be sucked into the nozzle.

A solution inlet conduit 43 is threaded into the nozzle body directly opposite the main air inlet port. It is provided with a flexible tubular extension 45, say a rubber hose, which is adapted to extend into the bottom of a container, say a bottle (not shown) but adapted to be threaded into a screw cap 46.

The thread on the solution pipe extends outside the body of the nozzle. The screw cap is held against a boss 48 on the bottom of the nozzle by a lock nut 50 threaded around the solution inlet conduit.

The apparatus may be used for a simple overhead spray irrigation operation. In such case, air is sucked into the nozzle through the air port 40, the solution inlet 43 being closed, for example by tying a knot in its flexible extension.

Water admitted under pressure to the inlet of the nozzle enters the throat of the apparatus and sucks in atmospheric air, since the throat and the first and second chambers constitute an eductor. Sufficient air is sucked into the system that the water becomes supersaturated, the excess air being dispersed in the stream as a separate phase in the form of fine bubbles. The resulting mixture of air and water enters the expansion chamber and is forced out of the perforations in the spray head as a group of supersaturated extremely fine jets.

The air dispersed in the stream passing through the eductor has a plurality of effects. It causes the jets to be finer and to be thrown much farther; and it results in the ejection of water which contains all the air it can dissolve, plus additional entrapped air. The net result is a spray of water for overhead irrigation which has such a low effective velocity and impact that it can be used safely to water freshly seeded beds and the like without fear of erosion of soil or seed. Moreover, the water carries a maximum of air into the soil, thereby aerating it and bringing about a displacement of carbon dioxide. The final result is an increase in plant growth in terms of units of water consumed.

From time to time, however, it may be convenient to use the spray nozzle for dispensing liquid fertilizer, insecticide, weed killer, et cetera. In such case, a bottle holding the appropriate chemical is screwed onto the cap 46. The solution is sucked up through the hose and enters the eductor, provided that sufficient suction is developed at the point where the solution line enters. The apparatus is so designed that the suction on the solution inlet line will be small except when the thumb is placed over the air inlet port 40, when the suction on the solution inlet is increased; the solution is sucked up and dispersed into the water stream, and thus ejected from the nozzle.

It is desirable to have some aeration even when the spray nozzle is sucking in solution. The small air bypass 42 comes into play to accomplish this and permits a restricted amount of air to be sucked into the eductor at the same time the solution is sucked in.

The apparatus of the invention finds extensive application among home gardeners, nurserymen, et cetera. It assures that unskilled labor will not damage seed beds, et cetera. Moreover, it is a versatile piece of apparatus which may be employed not only for irrigation with improved results, but also for applying the various types of chemicals which have become so much a part of all agricultural operations.

I claim:

1. A nozzle comprising an eductor having a restricted throat and an enlarged discharge section, a connection for a stream of high pressure first liquid at the rear of the throat, a port entering the side of the throat for inducing the flow of a second liquid into the throat, a second port entering the throat for admitting air into the throat, the second port being sufficiently large that when it is open suction on the first port is effectively destroyed and the second liquid is not induced to flow into the first liquid in the throat, the outer end of the second port being adapted to be closed by a finger to permit induction of flow of the second liquid in the first port, the discharge section of the eductor being composed of a plurality of stepped conduit sections increasing in cross section in the direction of liquid flow, and the eductor being so constructed that when the second port is closed a relatively constant proportion of the second liquid will be induced to flow into the first liquid over a substantially wide range of pressures on the first liquid.

2. Apparatus according to claim 1 provided with a further port for admitting a small proportion of air into the liquid stream, without destroying the suction on the first port, thereby causing the mixture of the two liquids to be aerated as discharged.

3. A nozzle comprising an inlet for water under pressure, an outlet for discharging liquid in the form of a spray, a restricted throat between the inlet and outlet, a first port opening into the nozzle into the path of water flow therethrough for inducing the flow of a liquid into the nozzle through the first port to commingle with the water flowing through the nozzle, a second port for admitting air into the nozzle, the second port being sufficiently large that when it is open suction on the first port is effectively destroyed and the second liquid is not induced to flow into the water passing through the nozzle, the outer end of the second port being adapted to be closed by a finger to permit induction of flow of liquid in the first port, the nozzle expanding outwardly to permit divergence of the water stream from the first port to the outlet.

STANLEY A. HAYES.

REFERENCES CITED

The following references are of record in the file of this patent:

UNITED STATES PATENTS

| Number | Name | Date |
|---|---|---|
| 2,004,403 | Davisson et al. | June 11, 1935 |
| 2,138,133 | Betzler | Nov. 29, 1938 |
| 2,183,561 | Hamblin | Dec. 19, 1939 |
| 2,210,846 | Aghnides | Aug. 6, 1940 |
| 2,339,320 | Carlson et al. | Jan. 18, 1944 |

FOREIGN PATENTS

| Number | Country | Date |
|---|---|---|
| 18,033 | Australia | May 6, 1930 |